(12) United States Patent
Huwyler et al.

(10) Patent No.: US 10,090,740 B2
(45) Date of Patent: Oct. 2, 2018

(54) METHOD FOR FABRICATION OF A CONDUCTOR BAR

(71) Applicant: ALSTOM Renewable Technologies, Grenoble (FR)

(72) Inventors: Markus Huwyler, Muri (CH); Andreas Koepfler, Waldshut-Tiengen (DE)

(73) Assignee: GE Renewable Technologies, Grenoble (FR)

( * ) Notice: Subject to any disclaimer, the term of this patent is extended or adjusted under 35 U.S.C. 154(b) by 170 days.

(21) Appl. No.: 14/881,425

(22) Filed: Oct. 13, 2015

(65) Prior Publication Data
US 2016/0111946 A1 Apr. 21, 2016

(30) Foreign Application Priority Data

Oct. 15, 2014 (EP) .................................. 14189092

(51) Int. Cl.
*H02K 15/00* (2006.01)
*B29C 43/00* (2006.01)
(Continued)

(52) U.S. Cl.
CPC ....... *H02K 15/0414* (2013.01); *B29C 43/003* (2013.01); *B29C 43/18* (2013.01); *B29C 43/36* (2013.01); *H01B 13/06* (2013.01); *H02K 15/105* (2013.01); *H02K 15/12* (2013.01); *B29C 2043/185* (2013.01); *B29K 2063/00* (2013.01); *B29K 2105/20* (2013.01); *B29K 2309/10* (2013.01); *B29K 2995/0005* (2013.01); *B29L 2031/3406* (2013.01);
(Continued)

(58) Field of Classification Search
CPC ........ H02K 15/00; H02K 15/04; H02K 15/04; H02K 15/041; H02K 15/041; H02K 15/0414; H02K 15/10; H02K 15/10; H02K 15/105; H02K 15/12; B29C 43/00; B29C 43/003; B29C 43/10; B29C 43/18; B29C 43/30; B29C 43/36; H01B 13/00; H01B 13/06
See application file for complete search history.

(56) References Cited

U.S. PATENT DOCUMENTS

| 3,840,416 A | 10/1974 | Schindelmeiser et al. |
| 6,559,384 B1 * | 5/2003 | Angell ............... H02K 3/48 174/116 |
| 2003/0141775 A1 * | 7/2003 | Younsi ............... H02K 3/14 310/201 |

FOREIGN PATENT DOCUMENTS

| EP | 0 774 823 A1 | 5/1997 |
| EP | 1 443 628 A2 | 8/2004 |
| (Continued) | | |

*Primary Examiner* — Jacob T Minskey
*Assistant Examiner* — Matthew Hoover
(74) *Attorney, Agent, or Firm* — Dority & Manning, P.A.

(57) ABSTRACT

The present disclosure relates to a method for fabrication of a conductor bar and to a use of a conductor tape with applied putty for the fabrication of a conductor bar. Described is a method for fabrication of a conductor bar including, applying a putty at one side of a conductor tape, applying a release foil at the other side of the putty opposed to the conductor tape, removing the release foil before applying the conductor tape to the narrow side of the conductor bar, providing a pressing mold with rounded edges at the inner side of the pressing mold, surrounding the conductor bar with putty and conductor tape with the pressing mold, and hot pressing the conductor bar with the pressing mold.

8 Claims, 5 Drawing Sheets

(51) Int. Cl.
  *H01B 13/00*   (2006.01)
  *H02K 15/04*   (2006.01)
  *H02K 15/10*   (2006.01)
  *H02K 15/12*   (2006.01)
  *B29C 43/18*   (2006.01)
  *B29C 43/36*   (2006.01)
  *H01B 13/06*   (2006.01)
  *H02K 3/14*        (2006.01)
  *H02K 3/40*        (2006.01)
  *B29K 63/00*       (2006.01)
  *B29K 105/20*      (2006.01)
  *B29K 309/10*      (2006.01)
  *B29L 31/34*       (2006.01)
  *B29L 31/00*       (2006.01)

(52) U.S. Cl.
  CPC .......... *B29L 2031/749* (2013.01); *H02K 3/14* (2013.01); *H02K 3/40* (2013.01)

(56) References Cited

FOREIGN PATENT DOCUMENTS

| | | | |
|---|---|---|---|
| JP | 63206134 | * | 8/1988 |
| JP | S63 206134 A | | 8/1988 |
| JP | 2001 061247 A | | 3/2001 |
| WO | 00/33443 A1 | | 6/2000 |
| WO | 00/35791 A1 | | 6/2000 |

* cited by examiner

METHOD FOR FABRICATION OF A CONDUCTOR BAR

CROSS-REFERENCE TO RELATED APPLICATIONS

This application claims priority to European Patent Application No. 14189092.1 filed Oct. 15, 2014, the contents of which are hereby incorporated in its entirety.

TECHNICAL FIELD

The present disclosure relates to a method for fabrication of a conductor bar and to a use of a conductor tape with applied putty for fabrication of a conductor bar.

BACKGROUND

The winding conductors of dynamoelectric machines are placed in slots in a laminated magnetic core. When currents flow in the conductors, magnetic fluxes occur across the slots which cause induced voltages and eddy currents in the conductor. Similar fluxes link the end turn portions of the conductor outside the slot, with some additional leakage flux from the rotor and stator, and cause similar induced voltages in the end portions. For this reason, the conductors of large machines are always of stranded construction, being built up of a substantial number of relatively thin strands to minimize the eddy current loss. The fluxes, however, are not uniform but vary radially in density so that the induced strand voltages vary from strand to strand and circulating currents due to these unbalanced voltages flow between the strands causing excessive losses and heating. For this reason, it is necessary to transpose the strands in order to cancel out as far as possible the unbalanced strand voltages to minimize the circulating currents and resultant heating.

Conducting bars or conductor bars in this technical field with transposed strands are commonly referred to as Roebel bars. These single conductor bars commonly contain a stack of two or four adjacent strands. Conductor bars have a rectangular cross-section with a smaller or narrower upper side and larger lateral faces. Conductor bars have a length of several metres depending on the electric machine to be applied. The mechanical impact of the transposition of the strands is that the surface structure of the small or narrow side of the conductor bar becomes uneven. This uneven surface of the conductor bar in this fabrication step complicates the wrapping of the main insulation layer and ends up in undefined electrical field strengths. To the end of obtaining a homogeneous surface a putty is applied to the surface of the conductor bar before wrapping the main insulation around the conductor bar. As a tool, to apply the putty, rectangular rods from steel are aligned along the conductor bar with putty. A disadvantage of this fabrication method is that the conductor bar is sharp-edged in the area at which the putty is applied. This makes necessary a further fabrication step of polishing the edges. The polishing step is commonly done manually and does not always result in an even and sufficient quality for an increased high electrical field strength design. Undefined radii and edges enhance the electric field strength undesirably leading to a reduced life time of the respective conductor bar.

SUMMARY

It is an object of the invention to fabricate a conductor bar for an electric machine which possesses a sufficient life time and to provide a straightforward fabrication method for a conductor bar.

This object is solved with the features of a fabrication method and the use of a conductor tape with applied putty for fabrication of a conductor bar according to the independent claims.

Further examples of the invention are disclosed in the dependent claims.

BRIEF DESCRIPTION OF THE DRAWINGS

Further characteristics and advantages will be more apparent from the description of a preferred but non-exclusive embodiment of the fabrication method and the use of a conductor tape with applied putty for fabrication of a conductor bar, illustrated by way of non-limiting example in the accompanying drawings, in which.

DETAILED DESCRIPTION

Figure 1:
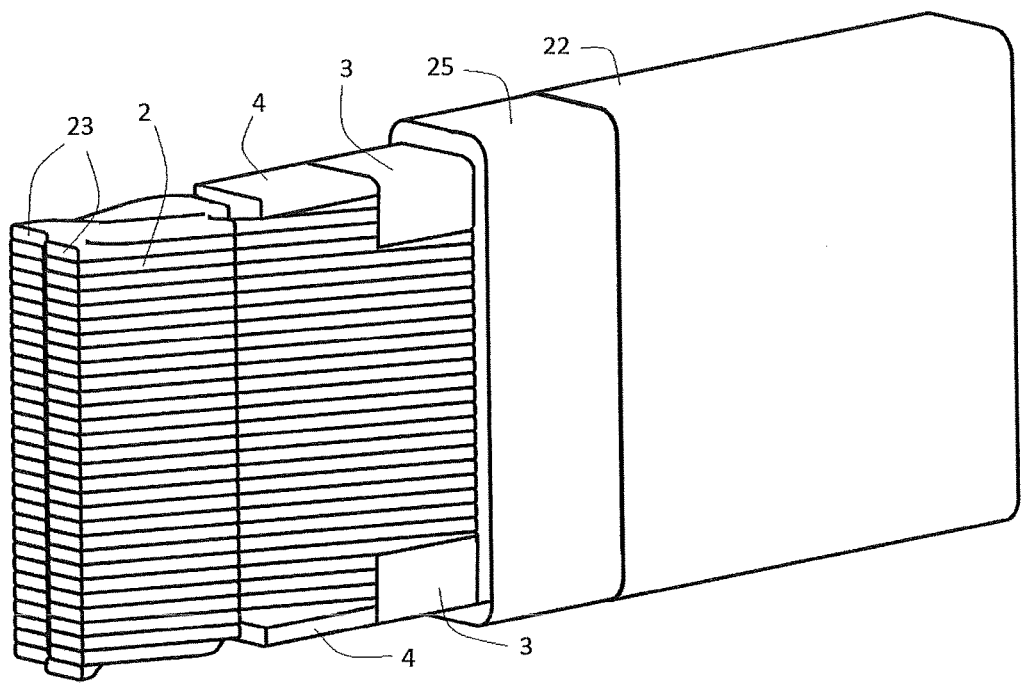
FIG. 1 shows a schematic perspective view of a part of a conductor bar according to an example of the invention, with interposed strands, a putty at the narrow sides of the conductor bar, a conductor tape covering the putty and small parts of the long side, and a main insulation layer.

With reference to the figures, these show different views of a conductor bar 2, a conductor tape 3 with putty 4 and release foil 6, and a pressing mould 10 for fabricating a conductor bar 2, wherein like reference numerals designate identical or corresponding parts throughout the several views.

FIG. 1 shows a schematic perspective view of a part of a conductor bar 2 for application in an electric machine, especially as a bar to introduce into notches in a stator or a rotor of a dynamo electrical machine. On the left side of FIG. 1 the conductor bar 2 is cut for sake of illustration. The conductor bar 2 comprises two abut layers of stacked strands 23 next to each other. The strands 23 are commonly made from copper and have a rectangular cross-section with defined radii and a single strand insulation. The conductor bar 2 has an elongated nearly rectangular cross-section with a long height and a small or narrow breadth. Visible is a transposition of the strands 23, the strands 23 change position between the two stacks of strands 23 at the bottom and at the top and are transposed in height such that the strands 23 change the level along the length of the conductor bar 2, as can be seen in FIG. 1. The strands 23 in the foreground stack have an orientation upwards and the strands 23 in the background stack have an orientation downwards, regarded from the right to the left. With several transpositions the strand 23 moves from the bottom to the top of the stack at which the strand 23 changes the position to the stack in the background and in turn moves down to the bottom of the stack of strands 23 again. A putty 4 is applied to the two narrow sides 22 on top and at the bottom of the conductor bar 2, as illustrated in FIG. 1 in a schematic way. The putty 4 according to this disclosure can be an electrically conducting putty 4, alternatively the putty can be an electrically non-conducting putty 4, or a semi-conductive material. In an example the putty 4 is a viscous epoxy resin filled with mica powder and conductive additives and has a resistivity between 1 k$\Omega$*cm$^2$/cm and 50 k$\Omega$*cm$^2$/cm. Further examples of materials of the putty 4 are silicon or thermoplastics. The putty 4 gets cured and hardened later. As is visible in FIG. 1 the putty 4 is not applied at the longitudinal or long side of the conductor bar 2. However, during fabrication a flow of putty along the longitudinal side can occur. The conductor tape 3, which is a conductive tape or a mica tape/paper, is applied at the putty 4 and fully covers the putty 4 at the top and at the bottom of the conductor bar 2. The conductor tape 3 is a strip of rectangular shaped material, as can be seen in FIG. 1. The conductor tape 3 comprises next to the mica tape or mica paper a support structure. This support structure can comprise fibre fabric, e.g. E-glass, foils, e.g. PET, or a fleece. Optionally, the conductor tape 3 can be designed according to the well-known state of the art. As can be seen the conductor tape 3 in this finished fabrication step covers the hardened putty 4 and also a part of the long sides, here around three strands 23 at the long sides are covered by the conductor tape 3. The whole conductor bar 2 is covered with a layer of a main insulation 25, which is shown in FIG. 1 in a cut view at the right side.

Figure 2:
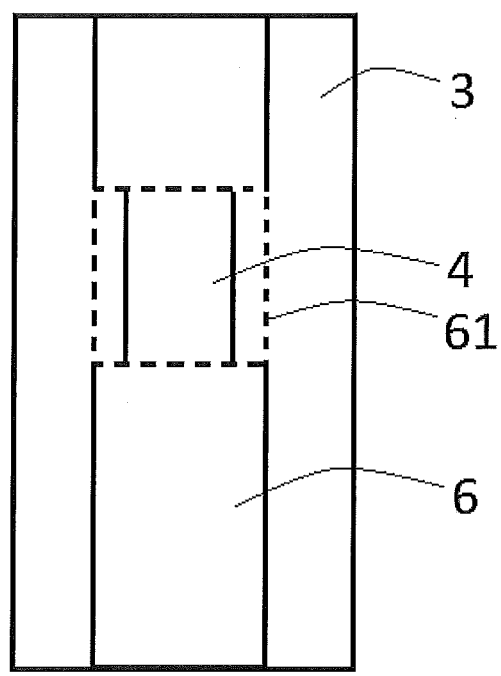
FIG. 2 shows a part of a conductor tape with an applied putty at the conductor tape and a release foil covering the putty, whereby a section of the release foil is depicted transparent.

FIG. 2 shows a schematic part of the conductor tape 3, in an example made from mica. In this perspective the putty 4 is applied onto the conductor tape 3. This is the perspective at the side of the conductor bar 2 to which the conductor tape 3 with putty 4 is attached. As can be seen the breadth of the strip of putty 4 essentially in the middle of the conductor tape 3 is smaller than the breadth of the conductor tape 3, with other words the conductor tape 3 is broader than the putty 4. The breadth of the strip of putty 4 is essentially identical to the breadth of the conductor bar 2, i.e. the narrow side 22 of the conductor bar 2. The breadth here is commonly the horizontal dimension in the plane of FIG. 2. By the aforementioned it is evident that the conductor tape 3 has a bigger breadth than the narrow side 22 of the conductor bar 2 and overlaps over the edges of the narrow side 22 when applied to the conductor bar 2, as visible in FIG. 1. The putty 4 is not hardened when applied to the conductor tape 3, thus the putty 4 sticks to the conductor tape 4 without further fasteners. On the conductor tape 3 and the putty 4 a release foil 6 is attached. The release foil 6 fully covers the putty 4, whereas the release foil 6 can have a smaller breadth than the conductor tape 3. The release foil 6 is releasably stuck to the putty 4 without further fasteners. Shown in FIG. 2 is a transparent section 61 for sake of illustrating the structure of the three layers, conductor tape 3, putty 4, and release foil 6, shown with dashed lines. The release foil 6 is naturally not transparent necessarily.

Figure 3:
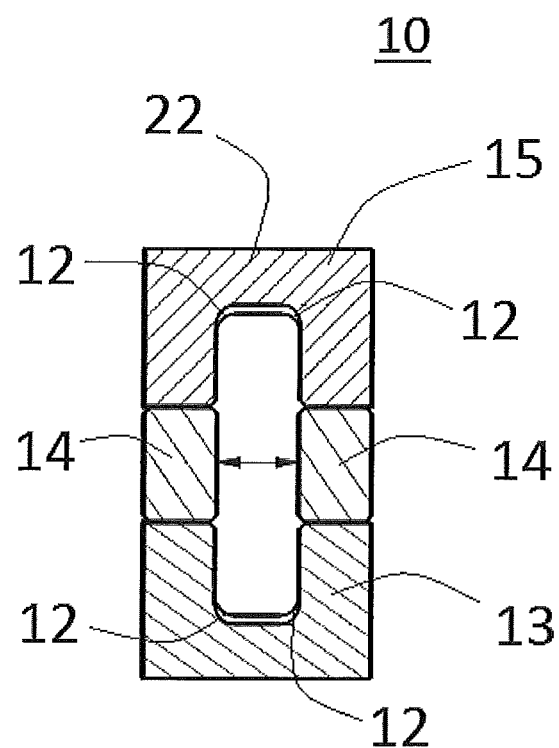
FIG. 3 shows a schematic front view of a pressing mould composed of four parts with rounded edges to encompass a conductor bar.

FIG. 3 shows a schematic front view of a cross-section of a pressing mould 10. The pressing mould 10 consists of four parts, an upper part 15, two middle parts 14, and a bottom part 13. The pressing mould 10 is designed to enclose a conductor bar 2 as described above when the four parts are assembled as shown in FIG. 3. The pressing mould 10 has a length of several metres to house main parts of the conductor bar 2 during the manufacturing steps of the conductor bar 2. The parts 12-17 are assembled by means of a crane or manually. The outer faces of the pressing mould 10 usually have a rectangular shape similar to the cross-section of the conductor bar 2 to be encompassed. The inner faces of the pressing mould 10 are straight along the height, the longer side, to abut against the conductor bar 2 during manufacturing. The inner faces of the smaller side of the pressing mould 10 are rounded, the faces have rounded edges 12 with a defined radius there. With other words the inner faces of the pressing mould 10 to abut the conductor bar 2 have a cross-section of a geometry of a kind of super ellipse, also called Lame oval, with mainly straight lines at the bottom, top, and sides of the cross-section like a rectangular, and bended lines to connect the straight lines. The geometry of the cross-section of the inner faces is thus a modified rectangle with no 90° angle in the contrary to a rectangle. This can be seen in FIG. 3. The rounded edges 12 abut the conductor tape 3 during fabrication of the conductor bar 2. The conductor tape 3 can be a tape made from mica or an electrically conducting tape. The effect of the rounded edges 12 of the pressing mould 10 and the conductor tape 3 overlapping over the putty 4 is that the putty 4 on the conductor tape 3 is fixed to the rude conductor bar 2 in a defined manner without sharp edges at the hardened putty 4. After hardening the putty 4 and removing the pressing mould 10 from the conductor bar 2 there is no need for a further fabrication step to milling and cleaning the putty 4. The edges of the finished conductor bar 2 have defined radii which is especially advantageous to avoid locally enhanced electrical field strength at the edges in operation. By the use of the specific pressing mould 10 and the conductor tape 3 in the described manner the putty 4 is applied on the spot, the putty 4 with the conductor tape 3 below can be fixed to the conductor bar 2 accurately at defined points so the end faces of the putty 4 are precisely defined. In detail the fabrication process has the following steps. The raw conductor bar 2 as shown at the left of FIG. 1 is commonly impregnated and the strands 23 are arranged in a transposed manner as shown and described. The not hardened putty 4 with some viscosity and adhesion power is applied to the conductor tape 3 which can be a tape from mica or mica compositions in an example. At the opposed side of the putty a release foil 6 is applied, therefore the putty 4 is sandwiched between the conductor tape 3 and the release foil 6, as can be seen in FIG. 2. The conductor tape 3 has a bigger breadth than the breadth of the putty 4 along the conductor tape 3, this means at the left and at the right of the conductor tape 3 there are free spaces not coated with the putty 4. The conductor tape 3 has a breadth of approximately 15-30 mm broader than the narrow side 22 of the conductor bar 2. The conductor tape 3 with putty 4 and release foil 6 can be rolled up to a roll for transport reasons. In the method step of applying the putty 4 to the conductor bar 2 the conductor tape 3 is then unrolled. A short time before application of the conductor tape 3 to the conductor bar 2 the release foil 6 is removed. This step can be done automatically in a winder machine. The conductor tape 3 is applied to the two narrow sides 22 of the conductor bar 2 with the putty 4 directed to the conductor bar 2 and the conductor tape 3 more distant from the conductor bar 2 not contacting the conductor bar 2 at the spots at which the putty 4 is applied. The part of the conductor tape 3 not coated with putty 4 is applied directly to the conductor bar 2. This is the part at the long side or longitudinal side of the conductor bar 2. The configuration is such that the putty 4 captures the narrow sides 22 of the conductor bar 2 and the conductor tape 3 covers the putty 4 at the narrow sides 22 and captures a small part of the larger side of the conductor bar 2, as can be seen in FIG. 1. The application of the putty 4 with the conductor tape 3 can be done manually or by means of a machine, a winder. The winder is a machine known in the state of the art comprising rollers to transport the conductor band 3 and supports for the conductor bar 2. An additional foil 8 is wrapped around the whole conductor bar 2 and envelopes the whole conductor bar 2. The additional foil 8 ensures that the pressing mould 10 is not contaminated with putty 4 and wear at the pressing mould 10 is avoided. This is illustrated schematically in FIG. 4. The next fabrication step as an example of the invention is to mount the four parts 13, 14, 15 of the pressing mould 10 around the conductor bar 2. In the assembled state the pressing mould 10 is configured according to FIG. 3, here without the conductor bar 2. The conductor bar 2 is then fixed within the pressing mould 10. In particular the conductor tape 3 adjacent to the bare conductor bar 2 abuts the narrow faces at the bottom and at the top, the rounded edges 12, and a small part of the larger sides of the pressing mould 10. As described the putty 4 captures the bare conductor bar 2 at the narrow sides 22 and has no direct contact to the pressing mould 10. In a further fabrication step the conductor bar 2 with the pressing mould 10 is placed into a hot press in which high temperatures of 130° C. to 180° C. and pressures of several bars, for example 20 bar, are applied to the conductor bar 2 with conductor tape 3, putty 4, and additional foil 8 for several hours, for example 1.5 h to 3 h. The additional foil 8 prevents the not hardened putty 4 from moving into the hot press. In the hot press the putty 4 is hardened and the putty 4 and the conductor tape 3 are fixed to each other and to the conductor bar 2, respectively. After hardening and fixing the conductor bar 2 and pressing mould 10 are removed from the hot press and the pressing mould 10 is disassembled.

Figure 4:
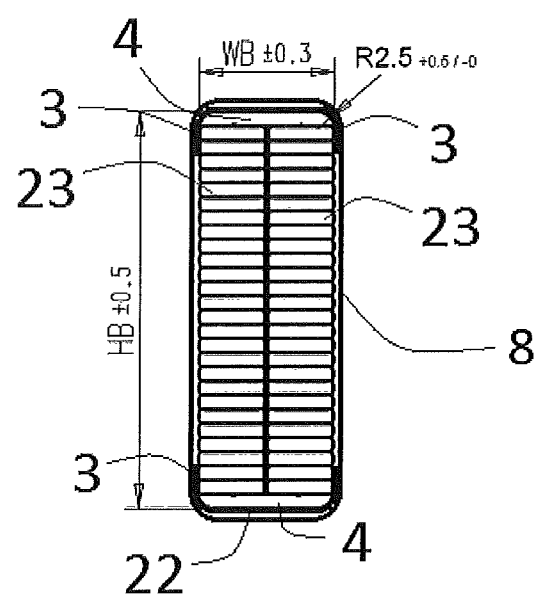
FIG. 4 shows a schematic front view of a cross-section of a conductor bar with applied putty and conductor tape as well as an additional foil as an example of a fabrication result of the method described.

The fabrication result is illustrated in a schematic way by a cut front view of the conductor bar 2 of FIG. 4. As can be seen in FIG. 4 the conductor tape 3 is attached to the conductor bar 2 at the bottom and the top of the conductor bar 2. The conductor tape 3 covers the hardened putty 4 in the area of the narrow sides 22 of the conductor bar 2. The conductor tape 3, which is a mica tape in an example, also covers the edges of the conductor bar 2 and small parts of the side faces next to the edges and remains at the conductor bar 2 after fabrication. As can be seen in FIG. 4 the accurately defined radii of the Conductor bar 2 are shaped to 0.5 mm to 3 mm, in this example 2.5 mm. Further advantages of the inventional method are that electrical field inhomogeneities in the area of the transposition of the strands 23 are avoided. As no further fabrication steps are conducted damages at the strands 23 can be excluded. Another advantage against the state of the art is that the removal of a carrier foil for carrying the putty 4 is not necessary as no carrier foil is applied. The function of the commonly used carrier foil to carry the putty 4 is adopted by the conductor tape 3 as described.

Figure 5:
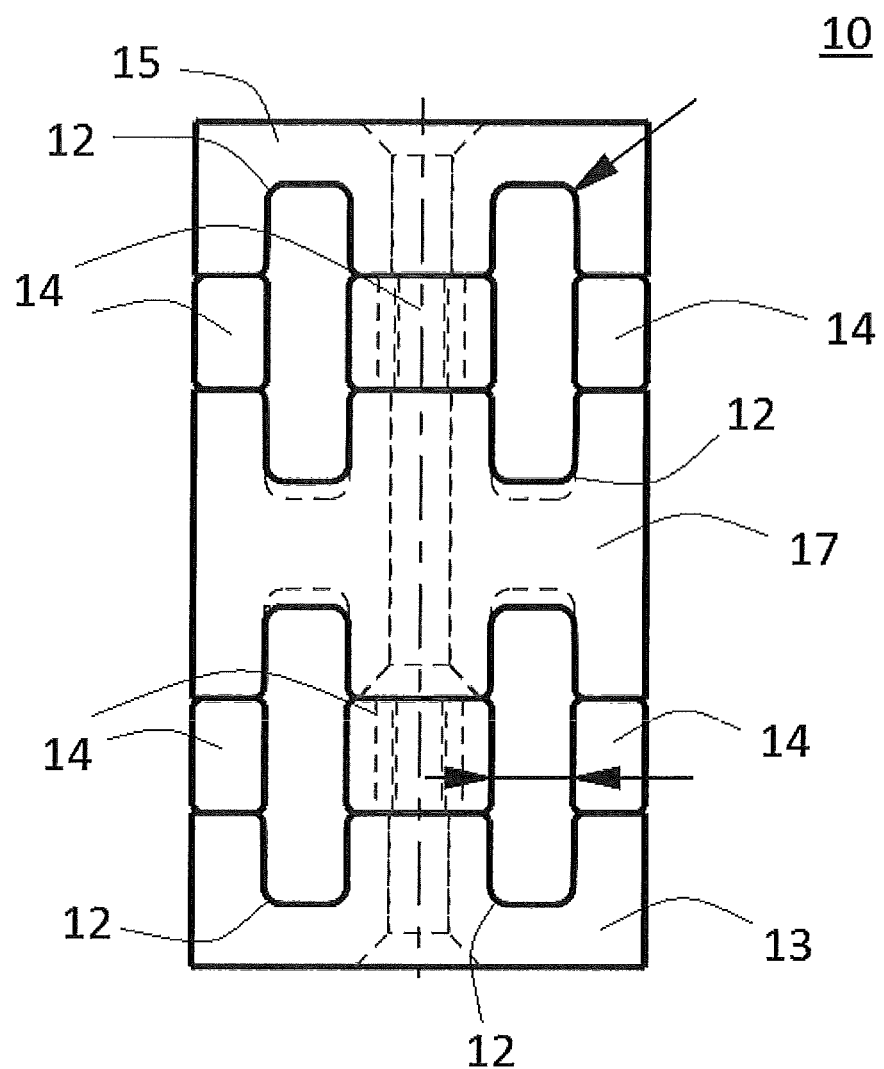
FIG. 5 shows a schematic front view of a pressing mould composed of nine parts with rounded edges to encompass four conductor bars similar to FIG. 3.

FIG. 5 shows a schematic front view of a pressing mould 10 composed of nine parts with rounded edges to encompass and fabricate four conductor bars 2 similar to FIG. 3. Hereby, the upper part 15 of the pressing mould 10 has two cavities to enclose the top parts of two conductor bars 2. Three middle parts 14 are arranged to be positioned at the left, in the middle and at the right side of the two conductor bars 2. An intermediate part 17 is arranged to abut the middle parts 14 at the top and at the bottom. At the top and at the bottom the intermediate part 17 has each two cavities to enclose each two conductor bars 2. Similarly, three middle parts 14 are also arranged below the intermediate part 17 to abut the intermediate part 17. The pressing mould 10 is closed at the bottom with the bottom part 13 which abuts the three middle parts 14 and which is shaped symmetrically to the upper part 15 to encompass two conductor bars 2. The inner faces of the pressing mould 10 are shaped to create conductor bars 2 with defined rounded edges 12. As can be seen the pressing mould 10 is suitable for fabricating four conductor bars 2 simultaneously. The examples given refer to a conductor bar 2 as a Roebel bar, further examples are designable, especially a conductor bar 2 as part of a coil.

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

The invention claimed is:

1. A method for fabrication of a conductor bar, the method comprising;
    applying a putty at one side of a conductor tape;
    providing a pressing mould with rounded edges at the inner side of the pressing mould;
    applying the conductor tape with the applied putty directed to the conductor bar together on the conductor bar such that the putty and tape are applied to the conductor bar in one step with the putty in a non-hardened state;
    the conductor tape and applied putty placed longitudinally over top and bottom sides of the conductor bar so that the conductor tape extends over the top or bottom side and at least partially onto longitudinal sides of the conductor bar;
    applying the pressing mould to the conductor bar;
    hot pressing the conductor bar by means of the pressing mould; and
    removing the pressing mould.

2. The method for fabrication of a conductor bar according to claim 1, wherein the conductor tape is broader than a width of the putty applied to the conductor tape.

3. The method for fabrication of a conductor bar according to claim 1, further comprising applying a release foil at the other side of the putty opposed to the conductor tape, and removing the release foil before applying the conductor tape to the narrow side of the conductor bar.

4. The method according to claim 1, wherein before the hot pressing in the pressing mould the conductor bar is completely enveloped by an additional foil, and removing the additional foil after hot pressing.

5. The method according to claim 1, wherein the conductor tape is a mica tape.

6. The method according to claim 1, wherein the step of applying the putty with conductor tape and release foil is conducted by a winder.

7. The method according to claim 1, wherein the pressing mould is built from four parts, an upper part, two middle parts each for a longitudinal side of the conductor bar, and a bottom part, whereas the upper part and the bottom part each have an inner radius of the edges of the inner side of 2.5 mm.

8. The method according to claim 1, wherein the pressing mould is built from nine parts, one upper part, three upper middle parts abut the upper part, one intermediate part abuts the three middle parts at the top and abuts three further lower middle parts below, and a bottom part abuts the middle parts, whereby the pressing mould is designed to include four conductor bars.

* * * * *